United States Patent [19]

Nicholson et al.

[11] Patent Number: 4,657,879

[45] Date of Patent: Apr. 14, 1987

[54] SILICATE SUPERIONIC CONDUCTORS AND METHOD OF MAKING SAME

[75] Inventors: Patrick S. Nicholson, Ancaster; Kimihiro Yamashita, Hamilton, both of Canada

[73] Assignee: Canadian Patents and Developments Limited, Ottawa, Canada

[21] Appl. No.: 653,889

[22] Filed: Sep. 25, 1984

[51] Int. Cl.[4] .................. C04B 35/16; C04B 35/50
[52] U.S. Cl. ...................... 501/152; 106/74; 423/263; 423/332; 429/33; 429/193
[58] Field of Search ............... 501/152; 423/263, 332; 429/30, 31, 33, 193; 106/74

[56] References Cited

U.S. PATENT DOCUMENTS 4,097,345  6/1978  Shannon .................. 204/59 AM

Primary Examiner—Mark L. Bell

Attorney, Agent, or Firm—Mitches & Co.

[57] ABSTRACT

The spray-drying of a feed liquid mixture containing dissolved feed elements is used to produce precursor powders of $Na^+$-super conducting sodium gadolinium silicate ($Na_5GdSi_4O_{12}$), (NGS), and sodium yttrium silicate ($Na_5YSi_4O_{12}$), NYS. Using these powders, very dense (>97% theoretical) solids are obtained on sintering. The resistivities of the NGS and NYS polycrystalline ceramics are 5 and 7 ($\Omega$ cm) respectively at 300° C. and are dependent on the f(NGS) or f(NYS) values. In the case of NYS, the resistivity/f(NYS) relationship takes the form $$\rho = [f(NYS)]^{\frac{-1}{0.50}} \hat{\rho}_{NYS}$$

indicative of resistive and conductive phases mixed more in parallel than in series.

16 Claims, 8 Drawing Figures

SILICATE SUPERIONIC CONDUCTORS AND METHOD OF MAKING SAME

This invention relates to a method of fabricating polycrystalline solid super-ionic conducting rare earth silicates.

Particularly, the invention relates to the preparation of sodium gadolinium silicate, $Na_5GdSi_4O_{12}$, sub. nom. NGS, and sodium yttrium silicate, $Na_5YSi_4O_{12}$, sub.- nom. NYS, specifically fine powders from which solid polycrystalline articles are produced. The powders and the solid ceramics have use as $Na^+$ conductors.

Sodium bonded rare earth atoms, $Na_5RESi_4O_{12}$ where RE=Gd of Y, have been known to be good $Na^+$ conductors but their creation is not only time consuming but the resulting yields are inadequate in that the single grain size is too large to create adequate dense polycrystalline ceramics.

According to a prior art method, selected starting materials including rare earth oxides are intimately mixed in an agate ball mill heated in air to about 900° C. to 1050° C. in a platinum crucible for 16 hours, quenched, ball milled again, reheated and quenched. The process reported [3, 8] for NGS and YGS is extremely time consuming (100 hrs.). Shannon in his U.S. Pat. No. 4,097,345 issued 27 June, 1978 entitled "Ionic Conductivity $Na_5YSi_4O_{12}$-Type Silicates" disclosed NGS and YGS in his FIG. 1 and their preparation by sintering pressed feed powder at 1000° C. for about 4 hours after a calcination at 1050° C. for 16 hours.

One of the co-inventors hereof has produced NGS and YGS ultra fine powders using a spray-freeze followed by freeze-drying utilizing feed materials of sodium silicate, $Na_2CO_3$ and $Gd(CH_3COO)_3$ or $Y(NO_3)_3$. NGS was obtained by sintering at 1050° C. for 0.5 hours and NYS by sintering at 1140° C. for 0.5 hours but only after the frozen powders were freeze dried under high vacuum for in excess of 30 hours.

It is an object of the invention to produce optimum conditions for the production of ultra fine powders of NGS and NYS having extremely high surface area and solid polycrystalline ceramics thereof with density approaching 95%, theoretical.

The invention contemplates a method of producing fine polycrystalline powder of $Na_5RESi_4O_{12}$ comprising the steps of;
  (a) selecting, as a feed material, water soluble compounds of sodium, and of a rare earth, that is selected either as a water soluble compound of Gd or of Y;
  (b) dissolving in solution, the selected feed materials wherein rare earth atoms are in concentrations ranging from 0.1M and 0.3M;
  (c) spraying the dissolved solution of step (b) into a hot air stream whereupon the solution is dried into minute powder;
  (d) calcinating the resultant powders of step (c); and,
  (e) reducing the physical size of the powders to at least 200 mesh.

Specifically the aforesaid method will produce a ceramic as a solid polycrystalline rare earth when the aforesaid method is continued as by;
  (f) compressing the powder of step (e) isostatically at between 30 to 60 kpsi; and,
  (g) sintering the pressed items of step (f) at between 1100° C. to 1180° C. for less than 30 minutes.

Particularly the Gd and Y are respectively in the form of $Gd(CH_3COO)_3$ and $Y(NO_3)_3$; and preferably Alpha Products, 99.9% pure. Specifically the sodium carbonate is Fisher Scientific compound reagent grade and the sodium compounds are in the form of a sodium carbonate (Fisher Scientific Company reagent grade) and a sodium silicate, National Silicates Ltd. $Na_2O/SiO_2 = \frac{1}{2}$ w/w).

The invention further contemplates a fine precursor powder with particle diameter of 0.50-7 $\mu$m and a high surface area (9 $m^2$/gram) of a super ionic $Na_5RESi_4O_{12}$ where RE=Gd, or Y.

The aforesaid powder, when compressed according to the aforesaid method and sintered becomes a dense ceramic of the aforesaid chemical composition, with density in excess of 95% and its resistivity at 300° C. in the range of 5-7 $\Omega$cm.

The preferred dense ceramic achieved is such that f(NGS) or f(NYS)=1.0 where $$f(NGS) = \frac{I_{2.766\text{Å}(NGS)}}{I_{2.766\text{Å}(NGS)} + I_{2.68\text{Å}(Na_3GdSi_3O_9)}}$$

and $$f(NYS) = \frac{I_{2.753\text{Å}(NYS)}}{I_{2.753\text{Å}(NYS)} + I_{2.673\text{Å}(Na_3YSi_3O_9)}}.$$

The invention will now be described by way of example and reference to the accompanying drawings in which.

Figure 5:
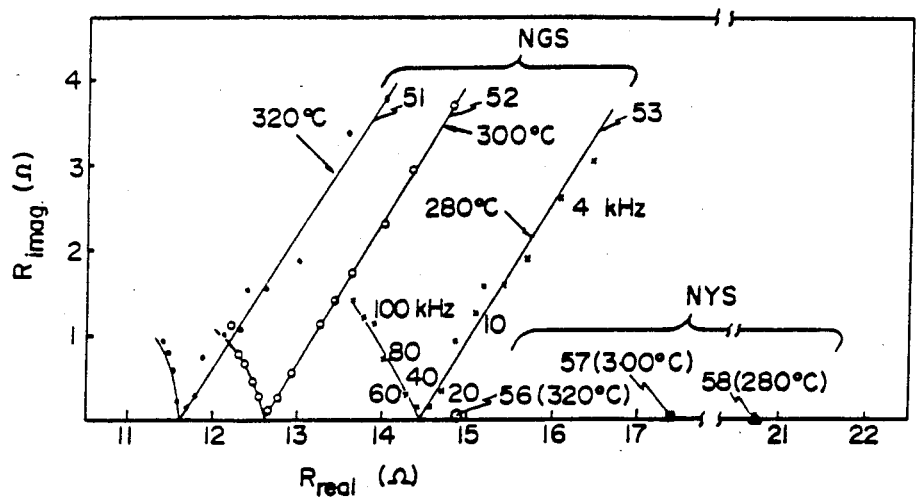
Figure 4:
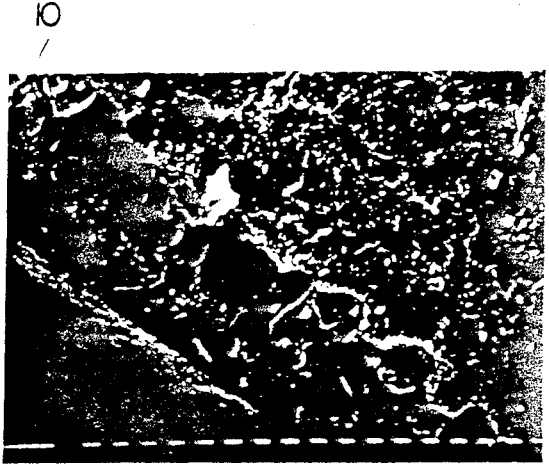
Figure 3:
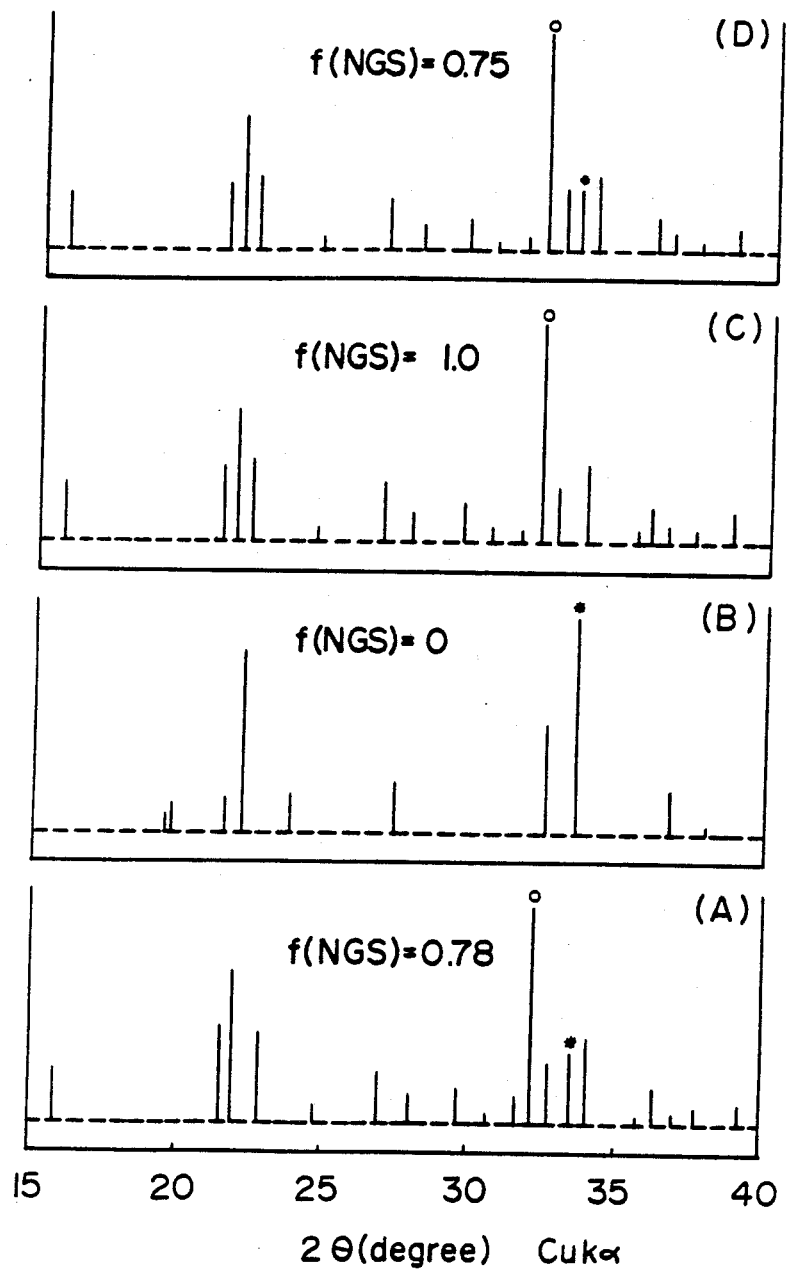

FIG. 3 are a plurality of x-ray diffraction patterns of calcined NGS powders; specifically FIG. 3(A) calcined at 700° C.; FIG. 3(B) calcined at 530° C. The respective sinters of NGS after calcination, FIG. 3(C) sinters obtained from calcined powders of FIG. 3(A) FIG. 3(D) sinters from the calcined powder of FIG. 3(B);

FIG. 4 is a fractured section of NGS sintered at 1050° C. for 0.5 hours with the poorly-conducting surface being the $Na_3GdSi_3O_9$ phase;

FIG. 5 is on the one hand (left hand portion) an AC impedance plot of NGS measured at 3 specific temperatures; namely, 320° C. (.); 300° C. (°); and, 280° C. (X); adjacent to the points plotted the digits indicate the measuring frequency in kHz; and the abscissa intersection indicate the pure resistance of NGS at the given temperature; the right hand portion of the graph gives equivalent pure resistance values for NYS.

Figure 6:
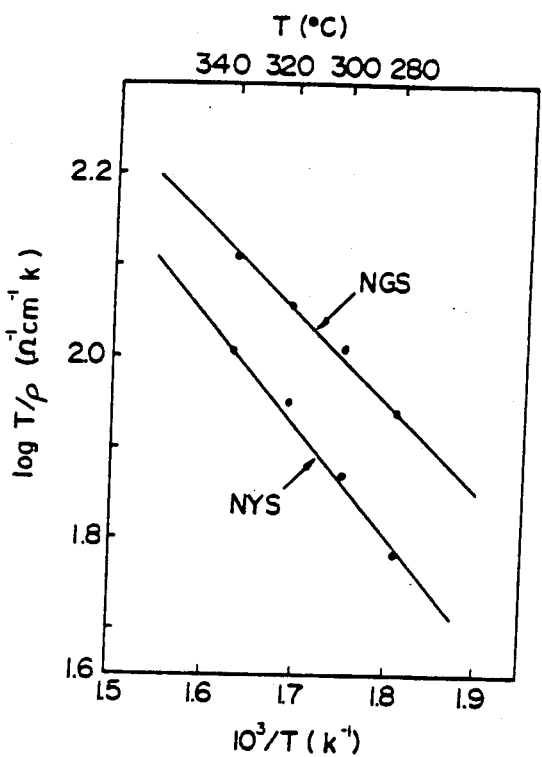
Figure 7:
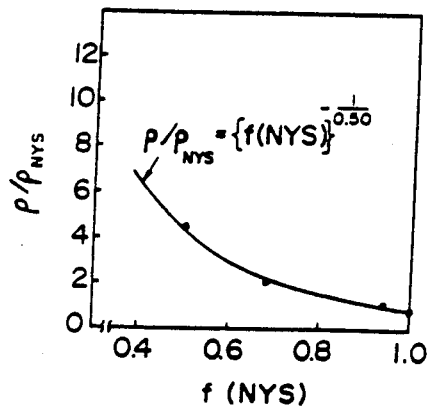

FIG. 6 is an Arrhenius plot of sintered NGS and sintered NYS;

FIG. 7 is the apparent resistivity, $\rho$ ($\Omega$cm) to $\rho_{NYS}$ of an NYS sample plotted against f(NYS).

BACKGROUND OF THE INVENTION $Na_5RESi_4O_{12}$ have been recognized as three dimensional super Na-ion conductors comparable to $\beta/\beta''$-alumina since the crystal structure was revealed by Maksimov et al. [1] It is well known that 42/90 of the $Na^+$ ions locating in the vicinity of $Si_{12}O_{16}$ rings in the unit cell are mobile [2,3, 4 and 5] and that the conductivity of the single crystal is almost isotropic [4,6]. This results in the high conductivity of polycrystalline NRES [7,8].

The family of NRES also has the advantage of lower sintering temperatures than $\beta/\beta''$-alumina. However, there are few reports on the production of polycrystalline $Na_5RESi_4O_{12}$. Shannon et al. [3] produced the ceramic $Na_5GdSi_4O_{12}$ (NGS) by means of the solid state reaction of $Na_2CO_3$, $SiO_2$ and $Gd_2O_3$. In that case, NGS was obtained following calcination at 1050° C. for 16 hours and sintering for 4 hours at 1000° C. Hong et al. [7] made $Na_5YSi_4O_{12}$ (NYS) from $Na_2C_2O_4$, $SiO_2$ and $Y_2(C_2O_4)_3$. This processing procedure required calcination at 1170° C. for 24 hours before 3 to 24 hour sintering at 1175° C. A co-inventor herein with Bentzen produced NGS [9] and NYS [10] using spray-frozen/freeze-dried powders of sodium silicate, $Na_2CO_3$ and $Gd(CH_3COO)_3$ or $Y(NO_3)_3$. Such fine powders make it possible to improve the sintering conditions. The latter obtained NGS by sintering 1050° C. for 0.5 hours and NYS by sintering at 1140° C. for 0.5 hours. The spray-frozen/freeze-dried method, however requires long times to dry the frozen powders under high vacuum, 24 hours or more.

Figure 1:
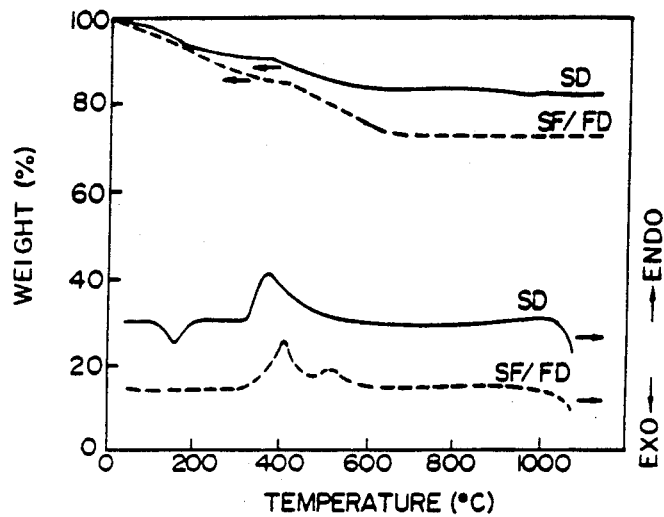
FIG. 1 is a thermal analysis of spray-dried (SD) and spray-frozen/freeze-dried (SF/SD) for $Na_5GdSi_4O_{12}$.

The Polycrystalline Precursor Powder of the Rare Earth Silicate Ceramics are Prepared in the Following Manner:

Mixed water-based solutions of 0.1M, 0.2M and 0.3M with respect to rare earth atoms (Gd or Y) were prepared from gadolinium acetate (Alfa products, 99.9% pure) for NGS or using yttrium nitrate (Alfa Products, 99.9% pure) for NYS, sodium carbonate (Fisher Scientific Company, reagent grade) and sodium silicate (National Silicates Ltd., $Na_2O/SiO_2=\frac{1}{2}$ w/w). The solutions were spray-dried in a spray-drier (Buchi 190, Buchi) where solutions were atomized from the top. The injection gas pressure and solution feed speed were maintained constant through out the work. The inlet and outlet temperatures were controlled as experimental parameters and are listed in Table I. Approximately one liter of solution is spray-dried in 20 to 30 minutes.
SEE TABLE I Thermal analyses were performed on the spray-dried powders to determine the optimum calcination temperature. For comparison, the results are indicated in FIG. 1 with those of the spray-frozen/freeze-dried powders [9,10].

Calcined powders were isostatically pressed at 30 to 60 kpsi into pellets and bars and sintered at 1100° to 1180° C. for less than 30 minutes whereby ceramics are formed. Pellets formed with a preferred pressure of compression of between 40 and 50 kpsi are noted in the table since they give high densities.
SEE TABLE II X-ray Diffraction Analyses of the spray-dried, calcined powders, and their polycrystalline sintered ceramic were carried out.

The surface area measurements and SEM observations were carried out after spray-drying, calcination, overnight ball milling and screening to characterize the powders.

X-ray diffraction analysis was performed to identify the phases in the sinters and to calculate the factor [9,10], f(NGS) or f(NYS) determining the ratio of the main phase (NS-type) to second phase according to the following, $$f(NGS) = \frac{I_{2.766\text{Å}(NGS)}}{I_{2.766\text{Å}(NGS)} + I_{2.68\text{Å}(Na_3GdSi_3O_9)}}$$

and $$f(NYS) = \frac{I_{2.753\text{Å}(NYS)}}{I_{2.753\text{Å}(NYS)} + I_{2.673\text{Å}(Na_3YSi_3O_9)}}$$

assuming that the major impurity phase is $Na_3$(Gd or Y)$Si_3O_9$ and I is the height of the X-ray diffraction peak as the d-spacing given. For 100% NGS or NYS, the functions equal unity.

Measurement of the Ionic Conductivity of NGS and NYS $Na^+$-ion conductiveness of both NGS and NYS were determined by measuring the ac impedance of sintered bars with the ratio of surface area to length=0.5, using non-blocking $NaNO_3/NaNO_2$ electrodes. Tests were conducted between 250° C. and 350° C. In order to remove any surface layers on the sinters, each of the specimens were ground, polished and dried at 150° C. before impedance measurements.

Characterization and Properties of NGS and NYS Spray-Dried Powders and Sinters

Referring to FIG. 1, it indicates that the decomposition of the starting salts is completed between 500° C. and 700° C. According to the prior art [9,10], the calcination temperatures and times were chosen from 530° C. to 700° C. for NGS and 640° C. for NYS for 3 to 24 hours. Optimum conditions for the production of the precursor powders are listed in Table I. Although the surface area of the spray-dried powders decreased during calcination (Table I), the powders are still active enough to produce dense NGS and NYS on sintering. It is also evident that the surface area is not dependent on the solution concentration but rather on the calcination temperature. It will become apparent that NGS will figure primarily as analogous results were obtained for NYS using similar techniques.

Figure 2A:
FIG. 2 are micro photographs of NGS powder, specifically FIG. 2a, the powder produced after spray-drying.
FIG. 2b, the powder after calcination at 530° C. overnight (10 hrs.)
Figure 2B:
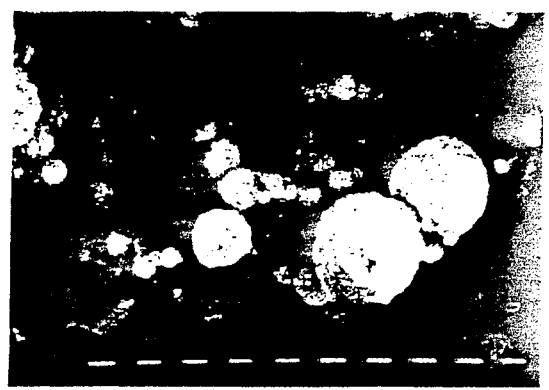

SEM photographs of the spray-dried and calcined powders are shown in FIG. 2. The diameter of the aggromerates in the spray-dried powders ranged from 0.5 to 7 μm (measured on the photographs). During calcination, some particles lost their high surface area by crystallization, however, most maintained a high surface.

Crystallization during calcination was identified by X-ray diffraction analysis. The diffraction patterns for $2\theta=15°$ to $40°$ are shown in FIG. 3. The function f(NGS) is calculated as a ratio of the typical NGS peak (°) to the second phase (*). FIG. 3(d) illustrates the diffraction pattern of a specimen of low f(NGS). The pattern of powders calcined at 530° C., FIG. 3(b), is akin to that of the $Na_3GdSi_3O_9$-type phase [9,12] whose chemical formula contains a lower ratio of Na/Gd=3 than NGS=5. Using the calcined powders, dense (>95% of theoretical) NGS was obtained as listed in Table II. The f(NGS) values varied however, from 0.75 to 1.0, FIG. 3(d). Sinters of loosely packed specimens (indicated as UNI in Table II) also had low f(NGS) values. Lower f(NGS) values can be explained by Na-loss [9,10], which would occur by surface evaporation in the former case, possibly via voids formed after decomposition of the incompletely calcined particles.

Comparing FIGS. 3(a) and (b), the $Na_3GdSi_3O_9$-type phase appears as a precursor for NGS. In the powders calcined at 700° C., FIG. 3(a), most of the precursor phase transformed into NGS-type, giving an f(NGS)=0.78, but as seen in FIG. 4, some of the Na$_3$GdSi$_3$O$_9$ phase remains on the surface. Using these powders, FIG. 3(a), dense (>98.0% of theoretical) NGS with an f(NGS)=1.0 was obtaind, FIG. 3(c). As shown in Table II, the f(NGS) of the pellets produced from the powders was independent of whether the pellets were covered with NGS powder or not during sintering. However, as the powders hardened during calcination, 700° C. seems too high for practical calcination. The following conditions were determined as optimum; 600° C.±15° C. for 4 to 24 hours (calcination) and at 1080° C. to 1100° C. for 15 to 30 minutes covered of NGS powder for sintering. Similar results were obtained for NYS, i.e., calcination at 630° C.±15° C. for 4 hours and sintering at 1180° C. to 1195° C. for 15 to 30 minutes covered NYS powders.

Under optimum conditions, satisfactory NGS and NYS were produced wherein >98% of theoretical density was achieved and f(NGS) or f(NYS)=1.0. However, in some cases, a surface layer, shown in FIG. 4 as 10, was observed over the NGS material 12. From an X-ray diffraction analysis, the layer 10 appears to be a Na$_3$GdSi$_3$O$_9$-type phase which is poorly Na-ion conducting. Where sintering was performed in Pt crucible and specimens were wrapped with Pt mesh and covered with calcined powders the layer 10 was voided and this mode of sintering may be preferred. However, Na evaporation might have occured during sintering. This evaporation of Na or deposition of decomposed powders on surfaces may be attributed to the formation of a surface layer having less Na atoms in its chemical formula than the preferred Na$_5$RESi$_4$O$_{12}$.

Ionic Conductivity of the Spray-Dried Ceramic, NGS and NYS

The resistivities of NGS and NYS to Na-ion conduction were calculated using values read from the intercept of a straight line (X-axis) on the real part of the impedance plot of FIG. 5. The intercept values were the same as those obtained from 20 kHz to 50 kHz. The whole of the three curves 51, 52 and 53 for NGS are plotted in FIG. 5 from measured values at each of the three temperatures, 320° C. for 51, 300° C. for 52 and 280° C. for 53. A profile for NYS was similar but displaced along the X-axis, thus only the intercepts of the three corresponding temperature curves are shown for clarity at the three temperatures 320°C., 300° C. and 280° C. The calculated results are shown on Arrhenius plots in FIG. 6. Although most of the previous reports do not include ac impedance measurements at a temperature as high as 300° C., the present results are consistent with those reported in references [9] and [10] and listed in Table III. Both NGS and NYS had low resistivities 3.8 to 8.3 Ωcm comparable with those of the Na-$\beta$/$\beta$″-aluminas and had activation energies of 4 to 7 kcal/mol.

TABLE III

Referring to Table III and reference [10], the resistivity and activation energy are dependent on the f(NGS) or f(NYS) values. In FIG. 7 the resistivity of NYS taken from reference (10) is plotted against f(NYS). The apparent conductivity $\rho$, is predicted by an empirical equation;

$$\rho = [f(NYS)]^{\frac{-1}{0.50}} \rho_{NYS}$$

where NYS is the resistivity of NYS with an f(NYS)=1.0. The same expression can be derived from the empirical mixing rule [13] taking into account the second phase being resistive (10$^6$ Ωcm) [12]. The expressed form indicates that the resistive microstructural components (grains and/or grain boundaries) are dispersed amongst conducting grains and the arrangement is in parallel rather than as a homogeniously mixed state or a series configuration. FIG. 7 also suggests that NYS with a powder f(NYS) (>0.80) still has high conductivity.

FOOTNOTES

[1] B. A. Maksimov, Y. A. Kharitonov and N. V. Below, Sov. Phys. Dokl. 18 (1974), 763.
[2] H. U. Beyeler and T. Hibma, Solid State Commun., 27 (1978), 641.
[3] R. D. Shannon, H. Y. Chen and T. Berzins, Mt. Res. Bul., 12 (1977), 969.
[4] H. U. Beyeler, R. D. Shannon and H. Y. Chen, Appl. Phys. Let., 37 (1980), 934.
[5] B. A. Maksimov, I. V. Petrov, A. Rabenau and H. Schulz, Solid State Ionics, 6 (1982), 195.
[6] H. U. Beyeler, R. D. Shannon and H. Y. Chen, Solid State Ionics, 3/4 (1981), 223.
[7] H. Y. P. Hong, J. A. Katalas and M. Bayard, Mat. Res. bul., 13 (1978), 757.
[8] R. D. Shannon, B. E. Taylor, T. E. Gier, H. Y. Chen and T. Berzins, Inorganic Chem. 17 (1978), 958.
[9] J. J. Bentzen and P. S. Nicholson, Mat. Res. Bul., Mat. Res. Bul., 15 (1980), 1737.
[10] J. J. Bentzen and P. S. Nicholson, Mat. Res. Bul., 17 (1982) 541.
[11] K. Masters, Spray Drying (john Wiley & Sons Inc., 1976, New York).
[12] R. D. Shannon, T. E. Giev, C. M. Foris, J. A. Nelen and D. E. Appleman, Phys. Chem. Minerals, 5 (1980), 245.
[13] J. M. Wimmer, H. C. Graham and N. M. Tallan, Electrical Conductivity in Ceramics and Glass (B), ed. by N. M. Tallan (MARCEL DEKKER, INC., New York, 1974), pp. 624–635.

TABLE I

Processing Conditions and Surface Area of Precursor Powders for NGS and NYS

| Material | Concentration of Solution (M) | Spray-Drying* (°C.) Inlet Temp. | Spray-Drying* (°C.) Outlet Temp. | Surface Area after spray-drying (m$^2$/g) | Calcination Temp. & Time Temp. (°C.) | Calcination Temp. & Time Time (hr) | Surface Area after calcination (m$^2$/g) |
|---|---|---|---|---|---|---|---|
| NGS | 0.1 | 210 | 75 | 24.3 | 530 | 24 | |
| | | 220 | 95 | 38.8 | | | |
| | | 220 | 110 | 42.4 | 700 | 3 | |
| | 0.2 | 220 | 108 | 46.1 | 560 | 24 | 9.2 |
| | 0.3 | 220 | 108 | — | 570 | | |

TABLE I-continued

Processing Conditions and Surface Area of Precursor Powders for NGS and NYS

| Material | Concentration of Solution (M) | Spray-Drying* (°C.) | | Surface Area after spray-drying (m²/g) | Calcination Temp. & Time | | Surface Area after calcination (m²/g) |
|---|---|---|---|---|---|---|---|
| | | Inlet Temp. | Outlet Temp. | | Temp. (°C.) | Time (hr) | |
| NYS | 0.2 | 220 | 105 | — | 640 | 3 | |

*The properties of spray-dried powders such as surface area, particle shape and size are dependent not only on dryer inlet and outlet temperatures, but also on the air pressure to atomize the solutions and the speed of feed of the solution (11). In the present work, both temperatures were employed under constant conditions of the other parameters.

TABLE II

Density and f(NGS), f(NYS) of NGS and NYS produced under various conditions

| Material | Pressing (kpsi) | Sintering Temp. °C. | Density (%) | f(NGS) or f(NYS) |
|---|---|---|---|---|
| NGS | 50*(1) | 1030 | 88.1 | 1.0 |
| | 50*(1) | 1050 | 95.4 | 1.0 |
| | 50*(1) | 1065 | 97.3 | 1.0 |
| | 50*(1) | 1062 | 98.3 | 1.0 |
| | 40*(2) | 1100 | 99.0 | 1.0 |
| | 40*(3) | 1100 | 99.0 | 1.0 |
| | UNI*(4) | 950 | — | 0.8 |
| | UNI*(4) | 1040 | — | 0.8 |
| NYS | 50*(1) | 1140 | 96.5 | 1.0 |
| | 40*(2) | 1180 | 99.0 | 1.0 |

Precursor powders were spray-dried from *(1) *(4) 0.1 M,
*(2) *(3) 0.2 M solutions
SD powders were calcined at temperatures of 530° C.
*(1) and at 700° C.
*(3) for between 3 hrs. and 24 hrs.
*(4) Pellets were pressed uniaxially. All pellets were sintered at listed temperatues for 0.5 hr.

TABLE III

Activation Energy and Resistivity at 300° C. of NGS and NYS.

| Material | Resistivity at 300° C. (Ω cm) | Activation Energy (kcal/mol) |
|---|---|---|
| NGS (99.7% dense) f(NGS) = 1.0 | 5.6 | 4.5 |
| NGS (98.3% dense f(NGS) = 0.83 | 5.8 | 4.5 |
| reported NGS (99.9% dense f(NGS = 1.0) | 3.8 | 4.4 |
| NYS (97.3% dense f(NYS = 1.0) | 7.7 | 5.9 |
| reported NYS (f(NYS) = (0.94) | 8.3 | — |
| reported NYS (97.7% dense f(NYS = 1.0 | 6.5 | 4.8 |

The embodiments of the invention in which an exclusive property or privilege is claimed are defined as follows:

1. A method of producing a fine polycrystalline powder of $Na_5RESi_4O_{12}$, where $RE = Gd$ or $Y$, comprising the steps of;
    (a) selecting, as a feed material, water soluble compounds of sodium, and of a rare earth, that is selected either as a water soluble compound of Gd or of Y;
    (b) dissolving in solution, the selected feed materials wherein rare earth atoms are in concentrations ranging from 0.1M and 0.3M;
    (c) spraying the dissolved solution of step (b) into a hot air stream whereupon the solution is dried into minute powder;
    (d) calcinating the resultant powders of step (c); and,
    (e) reducing the physical size of the powders to at least 200 mesh.

2. A method of producing a ceramic as solid polycrystalline rare earth sodium silicate by;
    (a) selecting, as a feed material, water soluble compounds of sodium, and of a rare earth, that is selected either as a water soluble compound of Gd or of Y;
    (b) dissolving in solution, the selected feed materials wherein rare earth atoms are in concentrations ranging from 0.1M and 0.3M;
    (c) spraying the dissolved solution of step (b) into a hot air stream whereupon the solution is dried into minute powder;
    (d) calcinating the resultant powders of step (c);
    (e) reducing the physical size of the powders to at least 200 mesh;
    (f) compressing the powder of step (e) isostatically at between 30 to 60 kpsi; and,
    (g) sintering the pressed items of step (f) at between 1100° C. to 1180° C. for less than 30 minutes.

3. The method as claimed in claim 1 or 2, wherein the rare earths selected are in the form respectively as $Gd(CH_3COO)_3$ and $Y(NO_3)_3$.

4. The method as claimed in claim 1 or 2, wherein the rare earths selected are in the form respectively as $Gd(CH_3COO)_3$ and $Y(NO_3)_3$ and each is 99.9% pure.

5. The method as claimed in claim 1, wherein step (a) the said Gd or Y atoms respectively reside as $Gd(CH_3COO)_3$ and $Y(NO_3)_3$ and each is 99.9% pure and, wherein sodium compounds are selected from sodium carbonate and sodium silicate.

6. The method as claimed in claim 1 or 2, wherein the rare earths selected are in the form respectively as $Gd(CH_3COO)_3$ and $Y(NO_3)_3$ and each is 99.9% pure and the sodium compounds are sodium carbonate and sodium silicate.

7. The method as claimed in claim 1 or 2, wherein step (c) maintains the spray-drying in the range of 75° C. to 220° C.

8. The method as claimed in claim 1 or 2, wherein the rare earths selected are in the form respectively as $Gd(CH_3COO)_3$ and $Y(NO_3)_3$ and each is 99.9% pure wherein step (c) maintains the spray-drying in the range of 75° C. to 220° C.

9. The method as claimed in claim 1, wherein step (a) the said Gd or Y atoms respectively reside as $Gd(CH_3COO)_3$ and $Y(NO_3)_3$ and each is 99.9% pure and, wherein sodium compounds are selected from sodium carbonate and sodium silicate wherein step (c) maintains the spray-drying in the range of 75° C. to 220° C.

10. The method as claimed in claim 1 or 2, wherein the rare earths selected are in the form respectively as $Gd(CH_3COO)_3$ and $Y(NO_3)_3$ and each is 99.9% pure and the sodium compounds are sodium carbonate and sodium silicate wherein step (c) maintains the spray-drying in the range of 75° C. to 220° C.

11. The method as claimed in claim 2, wherein the rare earth selected is Gd (CH$_3$COO)$_3$ and the sintering temperature of step (g) is at approximately 1100° C.

12. The method as claimed in claim 2, wherein the rare earth selected is Gd(CH$_3$COO)$_3$ and the sintering temperature of step (g) is at approximately 1100° C., while the compression step (f) is at approximately 40 kpsi.

13. The method as claimed in claim 2, wherein the rare earth selected is Y(NO$_3$)$_3$; and the sintering temperature of step (g) is at approximately 1180° C.

14. The method as claimed in claim 2, wherein the rare earth selected is Y(NO$_3$)$_3$; and the sintering temperature of step (g) is at approximately 1180° C., while the compression step (e) is at approximately 40 kpsi.

15. The method as claimed in claim 11 or 12, wherein the step (c) maintains the spray-drying in the range of 75° C. to 220° C.

16. The method as claimed in claim 13 or 14, wherein the step (c) maintains the spray-drying in the range of 75° C. to 220° C.

* * * * *